United States Patent
Kano

(10) Patent No.: US 7,509,454 B2
(45) Date of Patent: *Mar. 24, 2009

(54) SYSTEM AND METHOD FOR MANAGING DISK SPACE IN A THIN-PROVISIONED STORAGE SUBSYSTEM

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 11/723,569

(22) Filed: Mar. 21, 2007

(65) Prior Publication Data

US 2007/0174574 A1 Jul. 26, 2007

Related U.S. Application Data

(63) Continuation of application No. 11/523,546, filed on Sep. 20, 2006, now Pat. No. 7,263,578, which is a continuation of application No. 11/110,855, filed on Apr. 21, 2005, now Pat. No. 7,130,960.

(51) Int. Cl.
*G06F 12/00* (2006.01)

(52) U.S. Cl. .................... 711/112; 711/165; 711/170

(58) Field of Classification Search ............... 711/112, 711/165, 170
See application file for complete search history.

(56) References Cited

U.S. PATENT DOCUMENTS

| | | | |
|---|---|---|---|
| 5,412,780 A * | 5/1995 | Rushton | ............... 711/113 |
| 5,881,311 A | 3/1999 | Woods | |
| 6,598,143 B1 * | 7/2003 | Baker et al. | ............... 711/200 |
| 6,725,328 B2 | 4/2004 | Kano et al. | |
| 6,823,442 B1 | 11/2004 | Cameron | |
| 2005/0177684 A1 | 8/2005 | Hoshino et al. | |
| 2005/0195660 A1 | 9/2005 | Kavuri et al. | |
| 2005/0198436 A1 | 9/2005 | Iida et al. | |
| 2006/0064550 A1 | 3/2006 | Katsuragi et al. | |
| 2006/0090048 A1 | 4/2006 | Okumoto et al. | |

OTHER PUBLICATIONS

Geoffrey Hough, Sr., 3PAR Thin Provisioning, Eliminating Allocated-But-Unused Storage and Accelerating ROI, 3PAR Proprietary, Jun. 2003.

* cited by examiner

*Primary Examiner*—Reginald G Bragdon
*Assistant Examiner*—Aracelis Ruiz
(74) *Attorney, Agent, or Firm*—Mattingly, Stanger, Malur & Brundidge, P.C.

(57) ABSTRACT

A system and method for managing disk space in a thin-provisioned storage subsystem. If a number of free segments in a free segment pool at a storage subsystem is detected as below a desired minimum, one or more of the following is performed: selecting and adding logical devices (LDEVs) from an internal storage as free segments to the free segment pool, transitioning LDEVs to a virtual device (VDEV), and/or selecting and adding LDEVs from an external storage as free segments to the free segment pool. The transitioning includes identifying partially used or completely used LDEVs and transitioning these to the VDEV. Data migration may also occur by: selecting a source segment at a VDEV for migration, reading data from the source segment, writing the data to a target segment, the target segment being a free segment from the free segment pool, and assigning the target segment to the VDEV.

8 Claims, 21 Drawing Sheets

| | 101 | 102 | 103 | 104 | 105 | 106 | 107 |
|---|---|---|---|---|---|---|---|
| | Parity Group | Size | RAID | Disk # | LDEV | Start LBA | End LBA |
| | 1 | 1TB | RAID5 | 1,2,3,4 | 1 | 0 | 1073741823 |
| | | | | | 2 | 1073741824 | 2147483647 |
| | | | | | ... | ... | ... |
| | 2 | 2TB | RAID1 | 10,11,12,13 | 10 | 0 | 2147483647 |
| | | | | | ... | | |
| | 3 | 1TB | RAID0 | Ex1, Ex2 | 20 | 0 | 4294967295 |
| | | | | | ... | | |
| | 4 | 2TB | RAID0 | Ex3 | 40 | ... | ... |
| | ... | ... | ... | | ... | | |

FIG. 5

| VDEV | Size | Start VLBA | Offset | SEGMENT | Location |
|---|---|---|---|---|---|
| 1 | 3TB | 0 | 2047 | 100 | Internal |
| | | 4096 | 2047 | 101 | Internal |
| | | ... | ... | ... | ... |
| | | 20470 | 2047 | 300 | External |
| | | ... | ... | | ... |
| 2 | 4TB | 2048 | 2047 | 291 | External |
| | | ... | ... | ... | ... |
| ... | ... | ... | ... | ... | ... |

FIG. 8

| Ex-LU | Size | WWN | LUN |
|---|---|---|---|
| 1 | 500GB | 10.00.00.00.C9.36.07.32 | 1 |
| 2 | 500GB | 10.00.00.00.C9.36.07.32 | 2 |
| 3 | 1TB | 10.00.00.00.C9.36.07.DF | 1 |
| ... | | ... | ... |

FIG. 11

SYSTEM AND METHOD FOR MANAGING DISK SPACE IN A THIN-PROVISIONED STORAGE SUBSYSTEM

CROSS-REFERENCES TO RELATED APPLICATIONS

This is a continuation application of U.S. patent application Ser. No. 11/523,546, filed on Sep. 20, 2006, now U.S. Pat. No. 7,263,578, which is a continuation of U.S. patent application Ser. No. 11/110,855, filed Apr. 21, 2005, now U.S. Pat. No. 7,130,960.

BACKGROUND

1. Field of the Invention

This invention relates to a storage area networking system, and more specifically to managing disk space in a thin-provisioned storage subsystem.

2. Description of the Related Art

Management for an allocation-on-use system, also known as thin-provisioning, provides efficient storage space management for a virtual volume by allocating a certain sized storage area for data to be written. An allocation-on-use system should have a pool for free segments to allocate segments which store data during a host's write operation.

FIG. 1 shows a diagram of a contemporary thin-provisioning write operation. Initially, before use of a storage subsystem's allocation-on-use technology, an administrator typically assigns logical devices (LDEVs), which consist of disks based on a parity group with storage allocation for their Local Block Address, for a free segment pool 127. The storage subsystem divides the LDEVs into segments for the free segment pool based on user defined or system default sized segments. Once this has occurred, when a write access occurs for a logical block address (LBA), e.g., LBA 22520 by one LBA size, a virtual device (VDEV), which has LBA space without storage allocation for the LBA space, allocates a segment (#301) from the free segment pool 127 since here, the virtual logical block address (VLBA)'s segment is currently not assigned. Then the data is written.

FIG. 2 shows a flowchart of an example process on a VDEV when the VDEV is assigned to a logical unit (LU) and a portion of the VDEV is accessed by SCSI write (6) command and other write commands. It is determined if the segment desired to be accessed is assigned based on the host request LBA, 121. If the segment is not assigned, a segment is obtained from the free segment pool, 122. If the segment is assigned or obtained, the data is written to the requested LBA minus segment's VLBA to size of data, 123.

Generally, the pool is assigned statically, e.g., an Administrator assigns a disk or a portion of a storage area on an internal storage to the pool if the pool becomes low. This may work if there is a mount of disks on storage or if a customer engineer who maintains a customer's storage subsystem can go to a customer site and install new disks, when needed. However, this method is risky in that the new segment from the disk or the portion of storage area may not be installed because the disk is limited or the customer engineer can't go to the customer site when needed.

U.S. Pat. No. 6,725,328 entitled "Automated on-line capacity expansion method for storage device as a reference" discloses details on the early stage developments of allocation-on-use technology. Further, 3 Par Data's White Paper discloses a method of allocation of free space for virtual volume (www.3pardata.com/documents/3PAR_wp_tp_01.0.pdf, P13). However, this method only allocates new disks within a subsystem to free space after the system generates an alert regarding out-of-free-space to the administrator. Thus, there is a risk of being out of free space due to the late installation of new disks.

Therefore, there is a need for a system and method for managing a free segment pool when the pool is near out of space that allows an administrator to mitigate this risk by obtaining segments from a LDEV, added storage space, or from an external storage subsystem.

SUMMARY OF THE INVENTION

A system and method for managing disk space in a thin-provisioned storage subsystem. If a number of free segments in a free segment pool at a storage subsystem is detected as below a desired minimum, one or more of the following is performed: selecting and adding logical devices (LDEVs) from an internal storage as free segments to the free segment pool, transitioning LDEVs to a virtual device (VDEV), and/or selecting and adding LDEVs from an external storage as free segments to the free segment pool. The transitioning includes identifying partially used or completely used LDEVs and transitioning these to the VDEV. Data migration may also occur by: selecting a source segment at a VDEV for migration, reading data from the source segment, writing the data to a target segment, the target segment being a free segment from the free segment pool, assigning the target segment to the VDEV, and assigning the source segment to the free segment pool.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 5 is a diagram of a logical device configuration mapping according to an example embodiment of the present invention;

FIG. 8 is a diagram of an allocation table according to an example embodiment of the present invention;

FIG. 11 is a diagram of an external logical unit to logical unit number mapping according to an example embodiment of the present invention;

DETAILED DESCRIPTION

Figure 1:
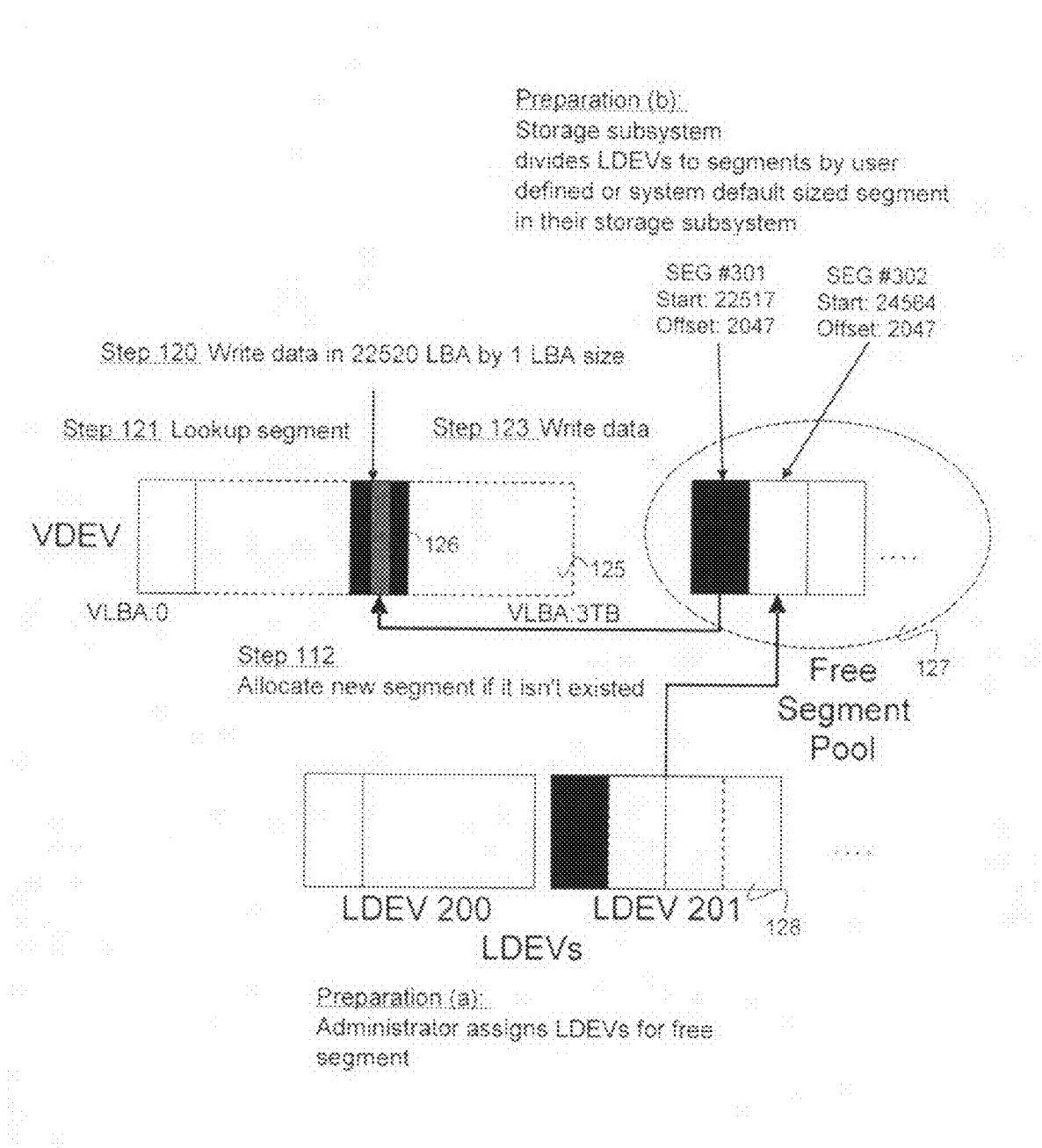
FIG. 1 is a diagram of a contemporary thin-provisioning write operation.

The particulars shown herein are by way of example and for purposes of illustrative discussion of the embodiments of the present invention. The description taken with the drawings makes it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the present invention relate to insuring that segments are always available in a free segment pool of a thin-provisioned storage subsystem by providing free segments to a free storage pool and advising an administrator of several storage resources when the pool is near out of space. According to embodiments of the present invention, two or more storage areas may be used, for example, unused blocks on an internal volume space like a logical device (LDEV) converting from LDEV to VDEV, and whole blocks on external volumes of an external storage device or remote storage subsystem which may be connected to the storage subsystem, for example, via Wide Area Network (WAN).

Moreover, after an administrator adapts these storage areas to the free segment pool, the data may be stored but residing in a temporally location because the administrator may desire to subsequently relocate the data and store the data at a new preferred or specified location. For example, the data may currently be residing on an external storage but it is desired to relocate the data to an internal storage, or vice versa. Thus, embodiments of the present invention also provide data aggregation to a store data at a location specified by the administrator. For example, the storage subsystem may migrate data to an administrator specified aggregation location after LDEVs, which a customer engineer set up, are assigned to the pool by the administrator to provide a place to temporarily store the data.

Figure 3:
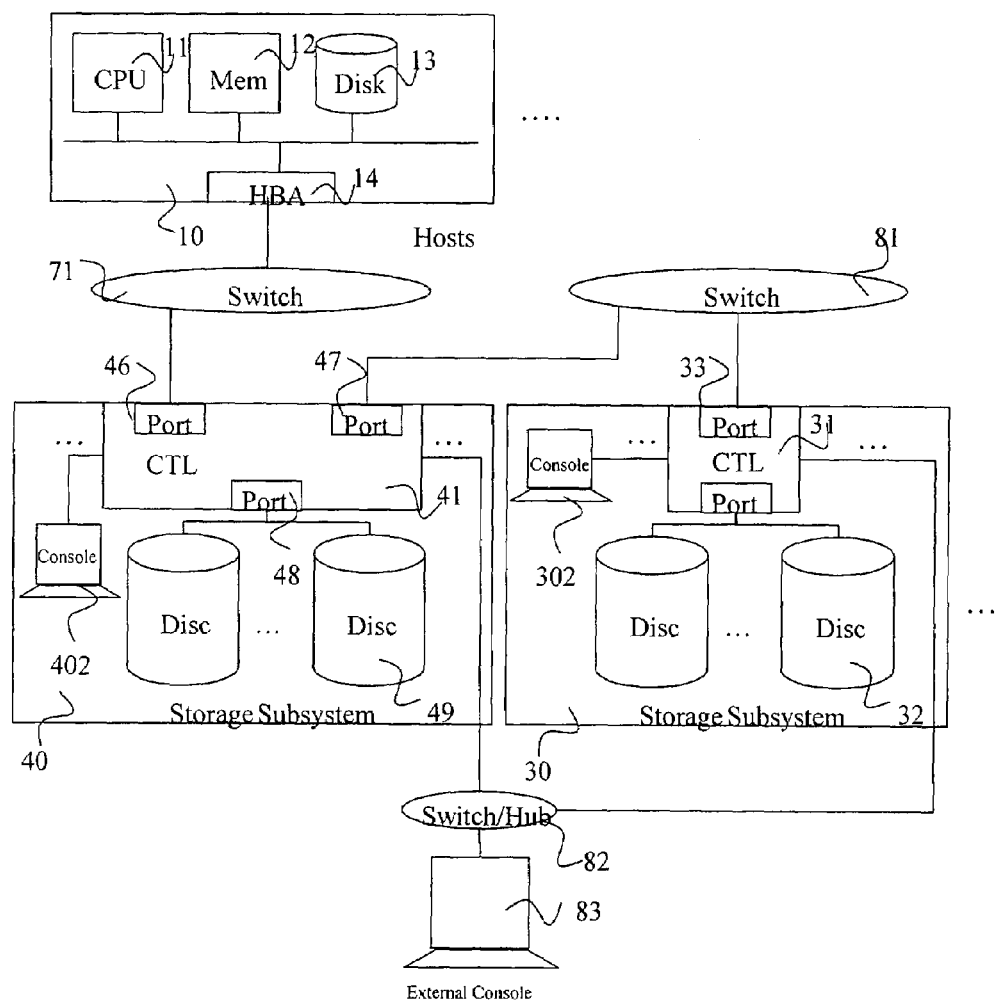
FIG. 3 is a diagram of a thin-provisioned storage subsystem for managing disk space according to an example embodiment of the present invention.

FIG. 3 shows a diagram of a thin-provisioned storage subsystem for managing disk space according to an example embodiment of the present invention. This embodiment includes a host device 10, a first storage subsystem 30, a second storage subsystem 40, and switch networks 71, 81 that interconnect the host(s) 10 to the storage subsystems 71, 81 and may also interconnect the storage subsystems 71, 81 to each other. Also, shown is an external console 83 interconnected to each storage subsystem via a switch/hub network 82.

The host 10 may be a computing device and perform processing and contain hardware elements and an operating system such as those found in a workstation or personal computer. The host 10 may contain a CPU 11, a memory 12, and an internal disk 13, all interconnected via an internal system bus. The host 10 may also include a Host Bus Adapter (HBA) 14 to connect the host 10 to one or more storage subsystems 30, 40 via a switch 71. The switch 71 may be any type switch useable for interfacing a host to a storage subsystem, for example, a Fibre Channel (FC) switch, an Ethernet switch, etc. Each host 10 may store data on a logical unit (LU) provided at a storage subsystem 30, 41.

The storage subsystem 30 includes one or more RAID controllers 41, one or more disks 49, and a management console 402. The controller 41 includes processors, memory, and NIC interfaces, e.g., Ethernet or FC port 46. The port 46 of the controller 41 allows connection of the storage subsystem 40 to one or more host devices 10 allowing the storage subsystem 40 to receive and process input/output (I/O) operations from the hosts. The controller 41 preferable includes non-volatile random access memory (NVRAM) and can use the NVRAM as a cache to store data and protect it, e.g., from a power failure. In case of a power failure, data stored in the NVRAM may be de-staged to a storage configuration area on a disk 49 using battery power for the controller 41 and the disk 49. The controller 41 provides FC ports 46 which have an associated WWN (World Wide Name) to specify a target ID for the storage subsystem 40 in the SCSI world, and may consist of a LUN on a FC port. SCSI I/O operations may be processed between host devices 10 and the storage at the storage subsystem 40. The SCSI I/O process is also applicable for iSCSI. The storage may consist of a RAID configuration using several disks 49 residing at the storage subsystem 40.

The storage subsystem 40 may have a management console 402 for use by a customer engineer, which may be connected to the controller 41. The console 402 may provide graphical user interfaces (GUIs) for the creation of parity groups from the disks 49. The storage subsystem 40 may also include connectivity to an external storage subsystem 30 via a port 47 in the controller 41 of the storage subsystem 40, a switch 81, and a port 33 in the controller 31 of the external storage subsystem 30. Thus, the controller 41 of the storage subsystem 40 may contain at least two types of ports, one port 46 may be for host connectivity and another port 47 may be for external storage subsystem connectivity.

The external storage subsystem 30 may be configured the same or similar to the storage subsystem 40 and may include a controller 31, one or more disks 32, and a management console 302 connected to the controller 31. Further, as noted previously, the controller 31 may also contain one or more ports, at least one port 33 of which allows connectivity through a switch or hub 81 to the storage subsystem 40.

The system may also include an external (to the storage subsystems) console 83 for use by an administrator that may be connected to a port on controller 31, 41 at each storage subsystem 30, 40 via a switch/hub 82, which may provide communications via TCP/IP like Ethernet, Token Ring, FDDI, etc. According to embodiments of the present invention, the controllers 31, 41 at each storage subsystem 30, 40 includes the functionality to implement thin-provisioned storage subsystem disk space management, which may be implemented in software, microcode, hardware, or a combination thereof.

A console 83 provides a capability for an administrator to manage the storage subsystem remotely via a switch, hub, LAN/WAN, etc 82. The external console 83 may provide GUIs for various operations such as, for example, the creation of a LDEV, the mapping of LDEV to Logical Unit (LU), the-creation of a free segment pool, the mapping of VDEV to LU, etc.

Figure 4:
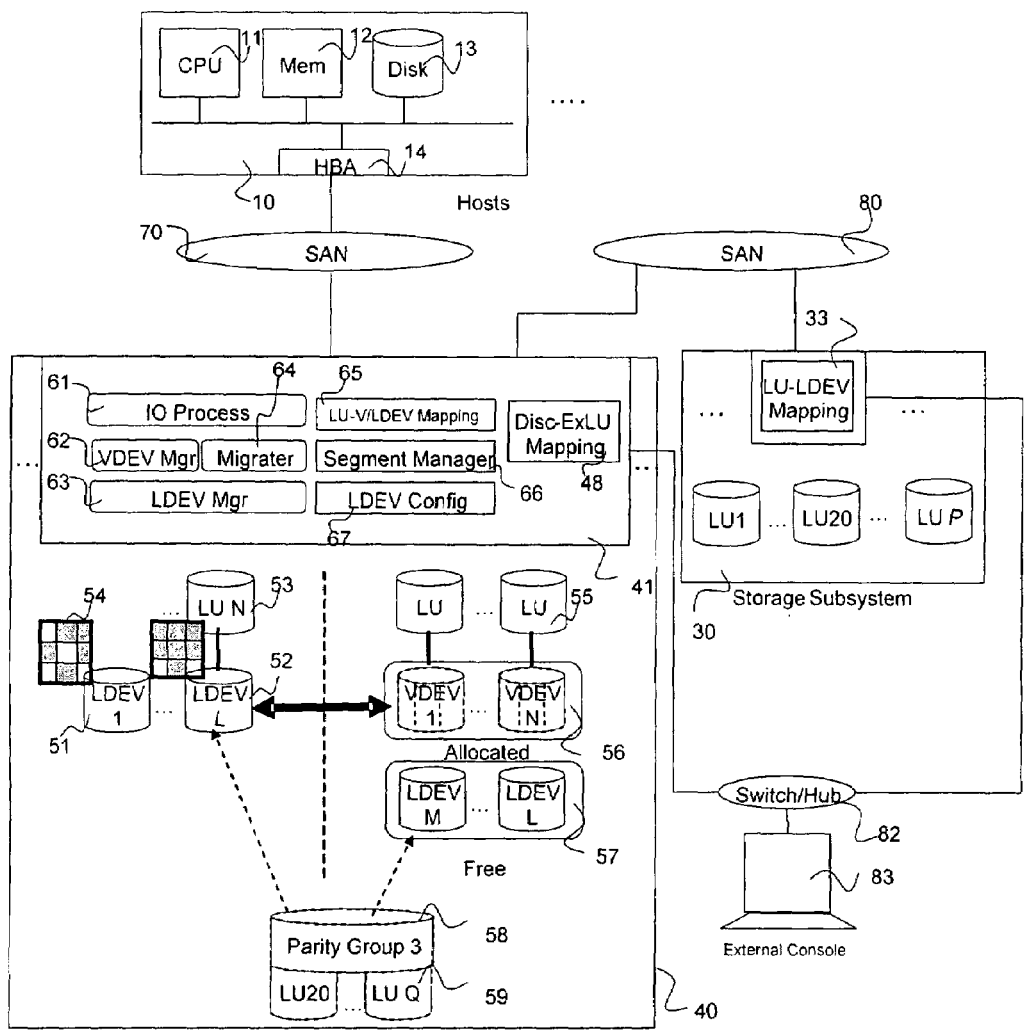
FIG. 4 is a diagram of a logical configuration of a thin-provisioned storage subsystem for managing disk space according to an example embodiment of the present invention.

FIG. 4 shows a diagram of a logical configuration of a thin-provisioned storage subsystem for managing disk space according to an example embodiment of the present invention. To illustrate the present invention, embodiments will be used where the components may be software or microcode components however, the present invention is not limited to these embodiments or implementations. A Storage Area Network (SAN) 70 provides a logical connection between a host 10 and a storage subsystem 40 using switches or a hub, e.g., Fibre Channel, Ethernet, etc. A LAN 82 provides a logical connection between an external console 83 and the storage subsystems 30, 40 and may include switches like Ethernet, FDDI, Token ring, etc. An external console 83 allows some functionality of the storage subsystems 30, 40 to be managed remotely.

The controller 41 on the storage subsystem 40 includes a processor and a memory that may contain modules that help provide management of disk space in a thin-provisioned storage subsystem according to the present invention. These modules may include a logical device manager (LDEV Mgr) 63 that creates a logical device to provide a logical storage from physical disks to an I/O process 61, a virtual device manager (VDEV Mgr) 62, and a migrater 64. Moreover, these may include a parity group manager (not shown). These modules may be implemented in microcode, software, or a combination thereof, resident and executed in the controller 41.

Moreover, the modules may be provided as program code installed from a storage media device such as, for example, an optical media, floppy disk (FD), or other removable media. A logical unit to logical device/virtual device mapping 65, segment manager 66, and disk to external logical unit mapping 48 may contain relationship information that may be stored in the form of a table.

A logical unit number (LUN) 53 is associated with one or more logical devices (LDEV) 51, 52. Each LDEV 51, 52 has an associated bit map 54 that indicates the usage of the segments of the LDEV. Each block (i.e., bit) in the bitmap represents a segment of the LDEV. Further, as noted previously, each logical unit 55 may have an associated virtual device (VDEV). LDEVs where many or most or all of the segments are used may be considered allocated 56 as can be seen from the bit map 54 for LDEV 51. In contrast, LDEVs where most or all of the segments are not used are considered free 57 as can be seen from the bit map for LDEV 52. The shaded squares in the bitmap represent unallocated segments of the LDEVs 51, 52. Moreover, one or more logical units 59 (with associated logical devices) may be a part of a parity group 58 and associated with LDEVs.

The LDEV manager 63 manages a LDEV's structure, processes a format for the LDEVs, and processes a behavior of read/write I/O processing from the mapped LU as SCSI target. A LDEV presents a logical storage area for a LU to store and return data from/to a host 10. A LDEV may be a portion of parity group. An administrator may define and initially format the region of the LDEV and store the number of each defined LDEV. A mapping between each LDEV and a parity group may also be stored in a LDEV Configuration 67, as shown in FIG. 5.

The initial format of a LDEV is requested by administrator. The default of format data may be 0, which may be the initial value stored in a bitmap 54 for the LDEV for each defined segment in the LDEV. The format data can be reconfigured by administrator, to be NULL or any other character, via an external console 83. The bitmap 54 for each LDEV is used to manage the written blocks in the LDEV since the initial formatting of the LDEV if the LDEV has not been assigned to a VDEV. Each bit in the bitmap manages a portion of sized blocks (segments) divided by the system or a user-defined size, e.g., 1 MB.

During the initial format for the LDEV, the controller formats a portion of the LDEV and reset the bitmap, e.g., set as "0". Moreover, an administrator may re-construct a bitmap by reading data related to each bitmap from a LDEV via an external console 83 if a bitmap for the LDEV has not been created. When an administrator requests to reconstruct the bitmap of a LDEV, a LDEV manager may read data for each segment related to each bitmap, and turn the bitmap "on", i.e., set to "1", if all data on a bitmap is the same as all "0" or the administrator defined character, or turns bitmap "off" if all data on a bitmap is not "0" or the administrator defined character. After re-constructing the bitmap, the administrator can use the LDEV as a migration source, which will be explained in more detail later.

The SAN 80 represents a logical connection between a storage subsystem 40 and another storage subsystem 30. This capability may be provided by, for example, a Fibre Channel switch, a hub, an Ethernet Switch, etc. Preferably, a Fibre Channel protocol may be used. This connection may be used in a Wide Area Network (WAN) to connect the storage subsystem 30 to a remote site. In this example embodiment, the SAN may use a FCIP, iSCSI or other type of remote connectable protocol and hardware.

The storage subsystem 30 may assume the role of the general storage subsystem based on RAID technology which provides several LUs to the SAN 80. However, if the storage subsystem 40 is used in the role as the general storage subsystem, the storage subsystem 30 may not need to have connectivity to an external storage device using a Disk-ExLU mapping (discussed following regarding FIG. 11) to connect to an external storage device.

FIG. 5 shows a diagram of a logical device configuration mapping according to an example embodiment of the present invention. The parity group manager module may be a part of microcode and may consist of a parity group from disks using RAID0/1/2/3/4/5/6 technology. RAID 6 based on RAID 5 technology is dual parity's protection. The created parity group has a parity group number 101 to identify the parity group within the storage subsystem, a usable capacity size 102 created from RAID technology, a RAID configuration 103, the disks 104 in the parity group, the LDEV number of the associated logical devices 105, the starting logical block addresses 106, and the ending logical block addresses 107.

Figure 6:
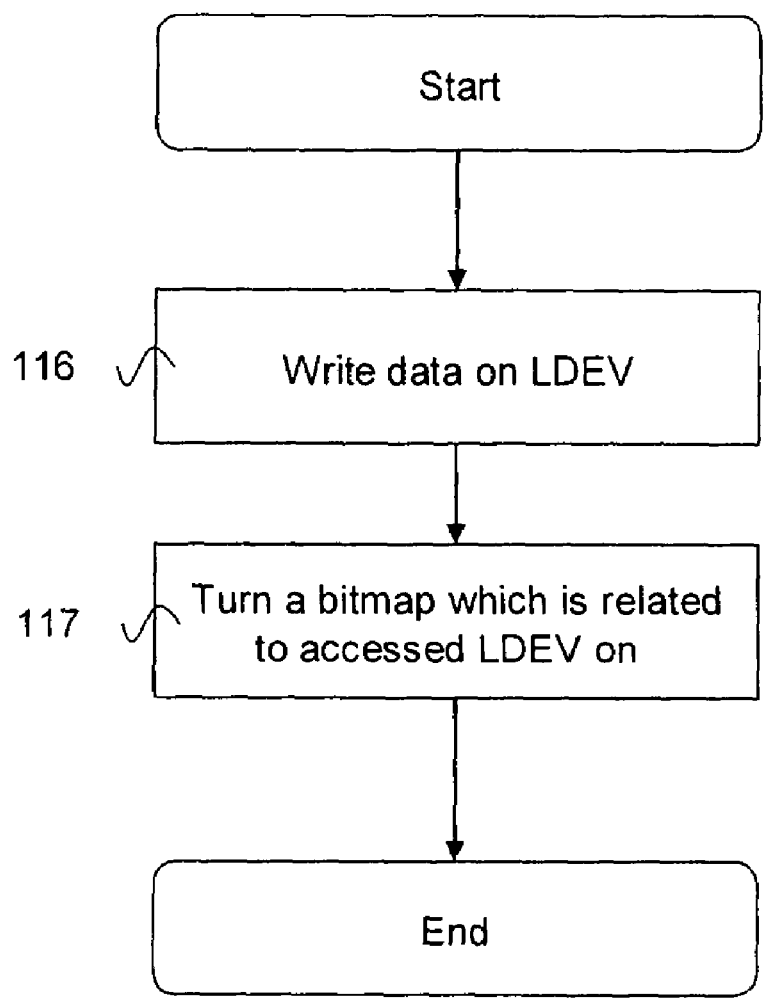
FIG. 6 is a flowchart of a LDEV write process according to an example embodiment of the present invention.

FIG. 6 shows a flowchart of a LDEV write process according to an example embodiment of the present invention. A write process is initiated by an initiator device like a host device, for example a SCSI write 6 or other write command, to access storage space on a LDEV. The data associated with the write is written on a LDEV through the LU specified by a starting LBA and size, 116. The one or more bitmaps related to the written segments on the LDEV are turned on, 117. As noted previously, this denoted that these segments of the LDEV are now used or allocated. The process then ends. As will be discussed later, the bitmap may be used for the migration of data from a VDEV to a LDEV and from a VDEV to a VDEV.

Figure 7:
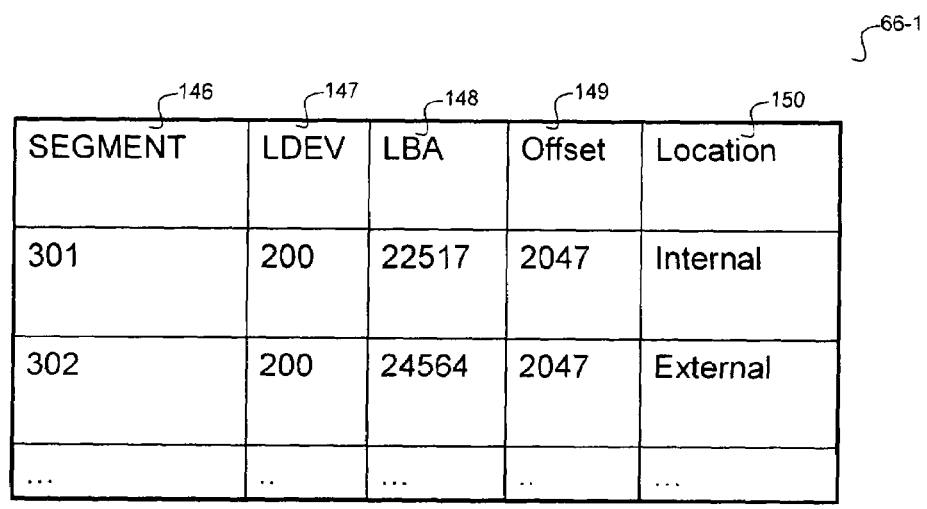
FIG. 7 is a diagram of unallocated segments of a logical device in a free segment pool according to an example embodiment of the present invention.

FIG. 7 shows a diagram of unallocated segments of a logical device in a free segment pool according to an example embodiment of the present invention. A free segment pool 66-1 contains segments that may be allocated to a VDEV as needed based on received I/O requests from host devices. The free segment pool contains information about each segment such as, for example, a segment number 146, the logical device that the segment is associated 147, a logical block address 148, an offset or size of the segment 149, and a location of the segment 150, e.g., internal to the storage subsystem or on an external storage subsystem.

A virtual device manager (VDEV Mgr) 62 creates one or more allocation-on-use technology based volumes. The VDEV is allocated a segment of storage area from the free segment pool 66-1 located at a segment manager 66 when a portion of a VDEV, which is divided by a size of the segment and has not allocated the segment, is written from a LU. The segment manager 66 may manage these storage segments.

FIG. 8 shows a diagram of an allocation table according to an example embodiment of the present invention. A storage segment has two characteristics, allocated and free, at least. As discussed previously, segments may be allocated 56 to VDEVs, or available for allocation and free 57 on a LDEV. An allocated segment has already been allocated and contains stored data. A VDEV manager contains information regarding segments allocated in each VDEV in an allocation table 66-0 to manage a virtual LBA (VLBA) space for each VDEV. The allocation table 66-0 contains information such as, for example, a VDEV number to identify a VDEV in the system 140, a host visible size of the VDEV 141 which is collected by a SCSI READ Capacity command from a host, each allocated segment information that has a managed starting VLBA 142, an offset 143 for a portion of the VDEV, a segment number 144 to store the data, and a location of the segment 145.

Typically, the offset for a segment is the same as the size of segment on the LDEV. However, a different size of segment other than that used on the LDEV may be used on the VDEV. In this situation, embodiments of the present invention may use a conversion table for converting addresses to exchange from the size of the segment in the LDEV as shown in table 66-1 to a size of the segment on the VDEV as shown in table 66-0 for the VDEV. Regarding unallocated segments within VDEV, It may specify '−1' on segment number 144 located in Start VLBA 142 and Offset 143.

If a segment is classified as "free" 57, the segment may be allocated from a free segment pool 66-1 which may be a part of segment manager 66. The segment pool 66-1 may be formulated and segments assigned from several LDEVs by an administrator. When an administrator assigns a LDEV to the free segment pool, the segment manager may divide the LDEV by a portion of a segment size that the segment manager may define or that may be preset by the storage subsystem. After this dividing, the free segment pool 66-1 may be formed.

Regarding the location of a segment, if the parity group (see FIG. 5) consists of only LDEVs on external storage subsystems (e.g., Ex1, Ex2), the location shows "external". Further, if the parity group consists of LDEVs on the internal storage subsystem and on an external storage subsystem (e.g., Ex1, LDEV 300), the location may show "mix". Moreover, if the parity group consists of LDEVs all on the internal storage subsystem (e.g., LDEV1, LDEV 2) the location may show "internal".

Figure 2:
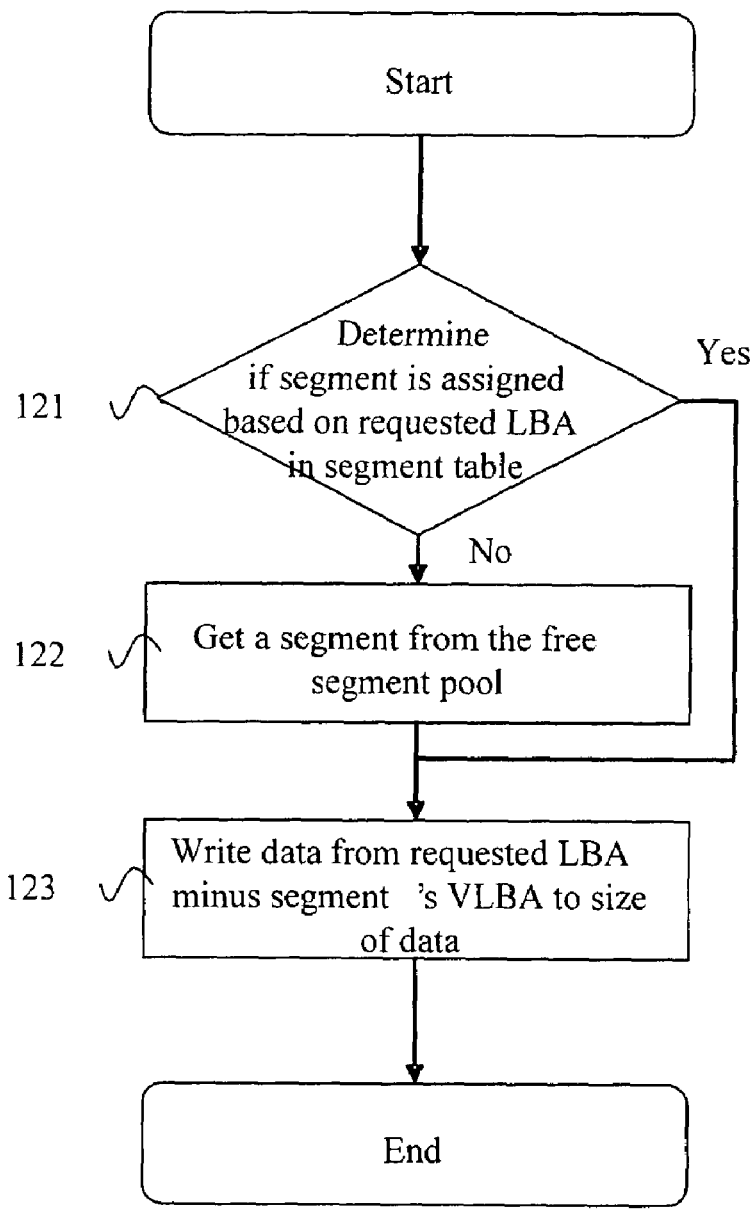
FIG. 2 is a flowchart of an example process on a VDEV when the VDEV is assigned to a logical unit (LU) and a portion of the VDEV is accessed by SCSI write (6) command and other write commands.

An example of the behavior of a VDEV, when the VDEV is assigned to a LU and a portion of the VDEV is accessed by SCSI write (6) command and other write commands was discussed previously regarding FIG. 2. Data belonging to the segment is looked up based on the host requested LBA in the VDEV's allocation table 66-0. If the segment is not found, a segment is obtained from the free segment pool 66-1. After this, or if this segment is found, data is written from the requested LBA. When a write access occurs for 22520 LBA by 1 LBA size, VDEV 22 allocates a segment (#301) from the free segment pool 127 because the VLBA's segment is currently not assigned, then the data is written. As noted previously, before we use the allocation-on-use technology, an administrator may assign LDEVs for the free segment pool 66-1, and the storage subsystem may divide the LDEVs into segments for the free segment pool 66-1 by a user-defined size or system default sized segment in their storage subsystem.

Figure 9:
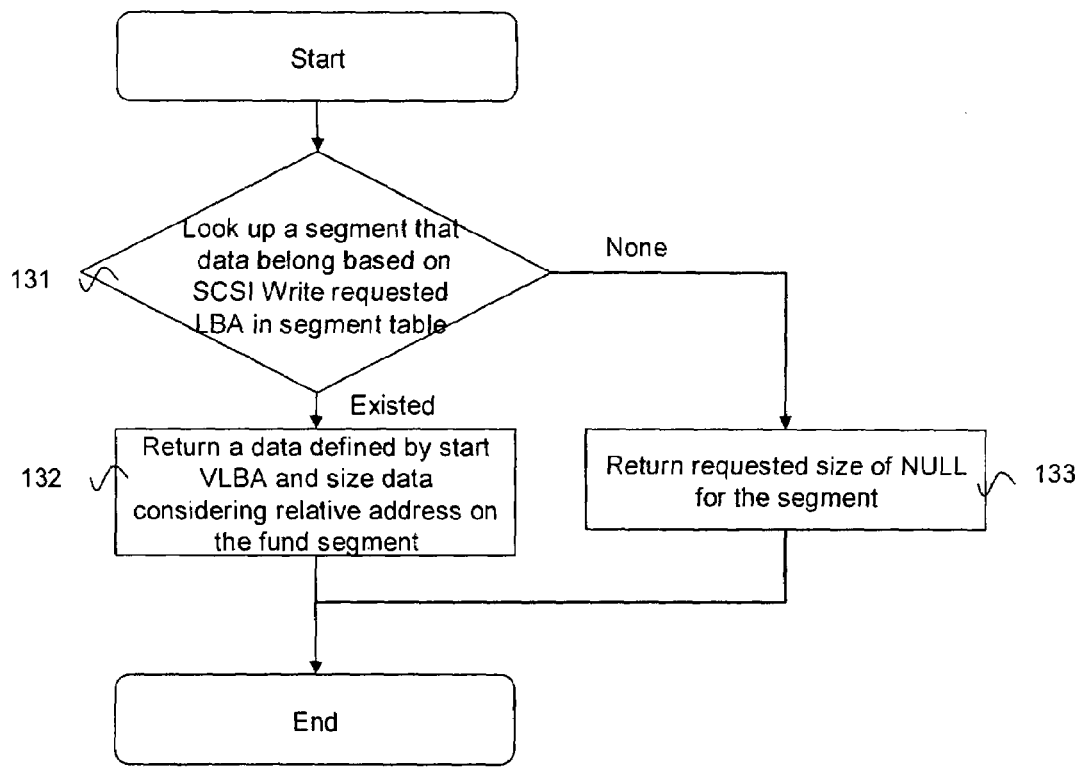
FIG. 9 is a flowchart of a read process in a thin-provisioned storage subsystem according to an example embodiment of the present invention.

FIG. 9 shows a flowchart of a read process in a thin-provisioned storage subsystem according to an example embodiment of the present invention. In case of a SCSI Read 6 command and other read commands, this access procedure looks up a segment in which the data belongs based on the SCSI read requested LBA in the segment table, 131. If the segment is found, data defined by the starting VLBA and size is returned considering relative address on the found segment, 132. After this, or-if the segment is not found, a set of "0", null, or an administrator defined character may be returned for the segment, 133. The size of the set may be requested by a SCSI write.

An I/O process 61 in the controller 41 of the storage subsystem 40 processes inputs/outputs on a LU requested from a host 10. This module mainly consists of two major sub-modules, a module to represent a LU via a port in the storage subsystem and a module of a SCSI I/O operation. The module of SCSI I/O operation processes the general SCSI-2/3 command sets. It may also process iSCSI commands.

Figure 10:
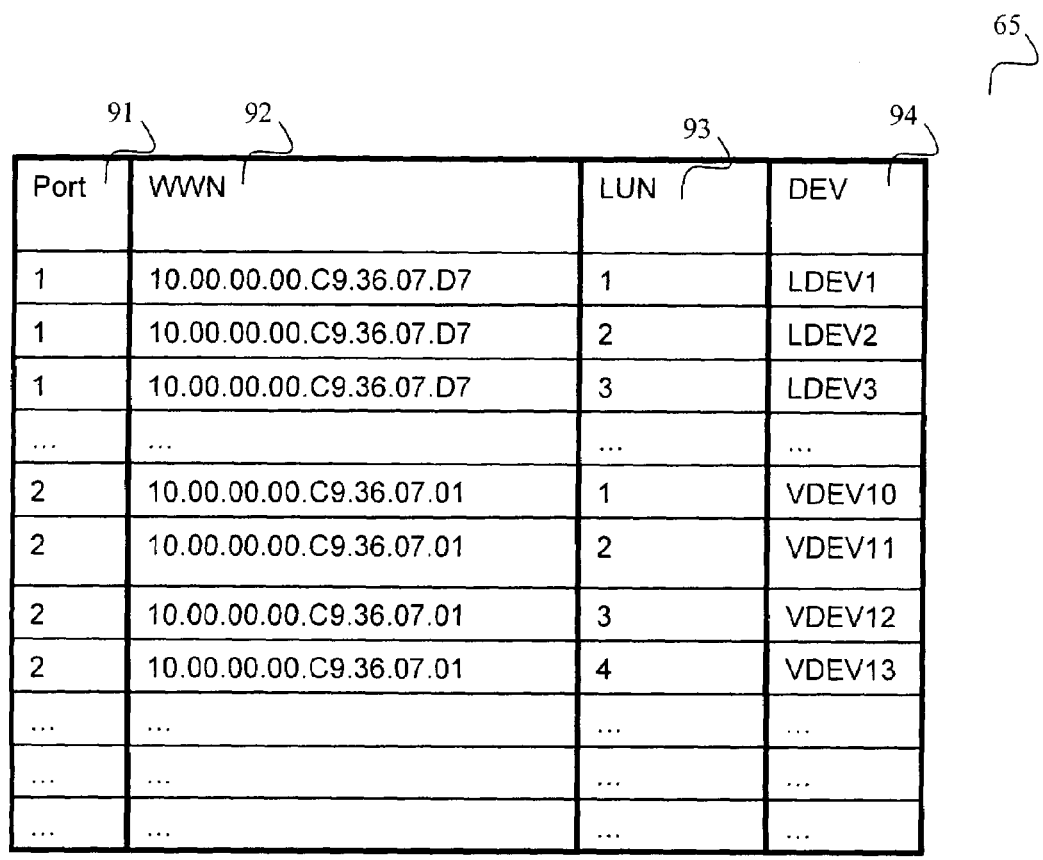
FIG. 10 is a diagram of a logical unit to device mapping according to an example embodiment of the present invention.

FIG. 10 shows a diagram of a logical unit to device mapping according to an example embodiment of the present invention. The module to represent a LU via a port in storage subsystem is used to represent a LU, where a controller 41 uses a LU-DEV mapping 65. The LU-DEV mapping 65 is in the form of a table to specify a LDEVNDEV from a host's perspective and includes, for example, a port number 91 to identify a physical FC-port on the storage subsystem, a WWN (World Wide Name) 92 to identify the port from host, a logical unit number (LUN) 93 to represent the storing location to host by SCSI, and a device name 94. The device name may be any of several types of volumes such as, for example, LDEV (in the case of a logical device), VDEV (in the case of a virtual device), etc.

A migrater module 64 has the capability to perform migration from LDEV to VDEV, from VDEV to LDEV, from VDEV to VDEV, and from LDEV to LDEV. Although there are several directions to migrate data, only two will be used to help illustrate the present invention, from LDEV to VDEV, and from VDEV to VDEV. This will be discussed in more detail later. Moreover, a scheduler (not shown) may be a task executor like a UNIX cron or a Windows® scheduled task, and may reside in the controller 41.

FIG. 11 shows a diagram of an external logical unit to logical unit number mapping according to an example embodiment of the present invention. This mapping may be in the form of a table and may reside at a storage subsystem with external storage connectivity and provides a mapping capability to allow an external LU on a storage subsystem 30 to be viewed as an internal disk. The mapping may include, for example, an external logical unit disk number 111, a size of the LU 112, a WWN 113, and a logical unit number (LUN) 114 to specify the target volume. To specify the external logical unit (Ex-LU) from the storage subsystem 40, the storage subsystem may use an identifier, e.g., Ex<Num>, as shown in FIG. 5 as disk number 104. This identifier indicates a LU on an external storage subsystem.

Figure 12:
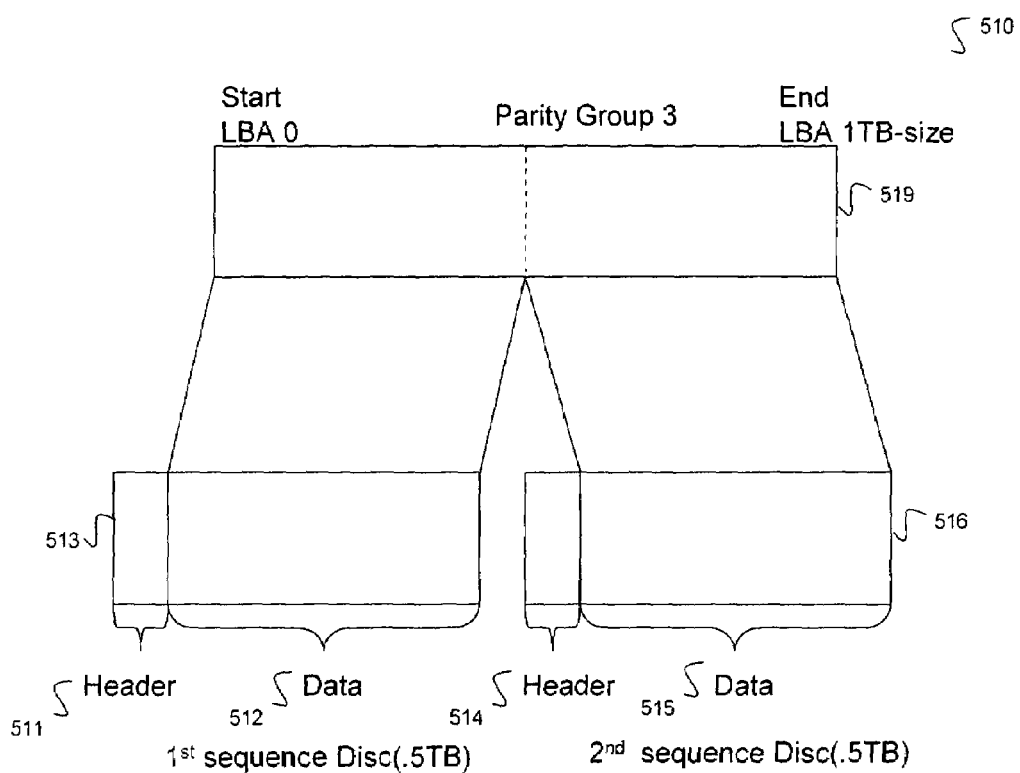
FIG. 12 is a diagram of a parity group structure according to an example embodiment of the present invention.

FIG. 12 shows a diagram of a parity group structure according to an example embodiment of the present invention. Embodiments of the present invention use logical devices and virtual devices. These devices may consist of several parity groups. A parity group may be set by a customer engineer during installation of new disks at a storage subsystem. For example, if the disk installation occurs on the storage subsystem 30, a customer engineer may provide a physical connection, such as for example, a Fibre Channel cabling and a logical connection which may use a Fibre Channel protocol connection, for example, a port login by World Wide Name to the storage subsystem 40 and to the external storage subsystem 30. After the connection is established, an administrator may create a logical device from a parity group or assign a free segment space to a free segment pool 66-1 for a virtual volume, and create a virtual volume.

A storage subsystem can create a parity group from an external LU when the controller in the storage subsystem becomes a SCSI initiator. For example, using a 500GB (0.5TB) LU provided from an external storage subsystem and 500GB LU provided from the external storage subsystem, after creating the Disk-Ex LU mapping, a volume manager may create a single parity group concatenating from two 500GB LUs, which each have already been assigned an identifier for the logical disk. Each LU in the parity group has related information such as header information 511, 514, an offset of a LBA (Logical Block Address), i.e., the starting address space of the LU, size (e.g., in this example embodiment, the size of the logical unit is 512 bytes), and other possible information as shown previously (e.g. FIGS. 5, 10, 11), for example, data space on the parity group number, belonging parity group, size, affiliation LU (port and LUN on port), number of logical disk, configuration (concatenation, RAID0/1/2/3/4/5/6), sequence of the LUs for the configuration, etc. The data space size is a total of the LU size minus the header for the LDEV. In this example embodiment, the size of the header may be 5MB.

For example, when the size of the parity group for a particular LU is 1TB minus the size of headers, the address mapping between a LDEV and the physical address space on the storage subsystems may be as shown. For example, regarding the LBA 0 in the parity group 510, after the header size in a $1^{st}$ sequence LU 513, the data address space in the $1^{st}$ sequence LU may be from after the header 511 in the $1^{st}$ sequence LU to the size which may be written on the header in the $1^{st}$ sequence LU. The next data address space in the $2^{nd}$ sequence LU 516 may be from after the header 514 in the $2^{nd}$ sequence LU to the size on the header in the $2^{nd}$ sequence LU.

In another example embodiment of the present invention, storage subsystem 40 may use a volume without volume header information, which means that an external LU is directly attached to Ex-X without volume header.

Figure 13:
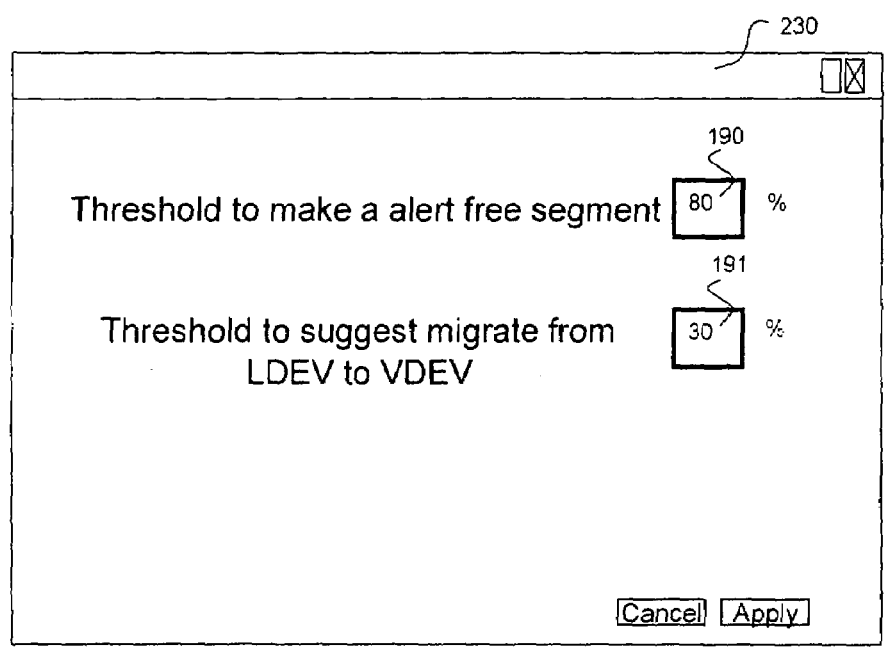
FIG. 13 is a diagram of a GUI containing threshold level information settable by an administrator according to an example embodiment of the present invention.

FIG. 13 shows a diagram of a GUI containing threshold level information settable by an administrator according to an example embodiment of the present invention. It is desired that a free segment pool needs to be kept at a certain threshold or rate of usage that indicates how many free segments are left. An administrator uses a GUI 230, or other CLI interface, to set information indicating a threshold level of free segments left 191 in a free segment pool where action may need to be taken to increase the available free segments. For example, if the available free segments fall to or below 30% of the total size of the free segment pool, an alert or other warning may be generated alerting the administrator that the pool is getting low, and may need additional segments via email, SNMP, pager, etc. Moreover, an administrator may set a threshold 190 in a GUI as a suggestion to migrate data from a logical device to a virtual device. This may occur to allocate more open un-written area on the LDEV to free space in the free segment pool 66-1. Of course, an administrator applies the modifications after making changes.

According to embodiments of the present invention, after the creation of a virtual device, the storage subsystem 40 may check a rate of free segments in the free segment pool 66-1 in order to maintain an administrator-defined or system-default-defined threshold 191 periodically. The defined rate may be defined by the administrator using a GUI at a maintenance console. If the rate is a system-defined default value, the rate may be used by the storage subsystem 40 regularly, until a new default rate is re-set by the administrator or customer engineer in the GUI.

Figure 14:
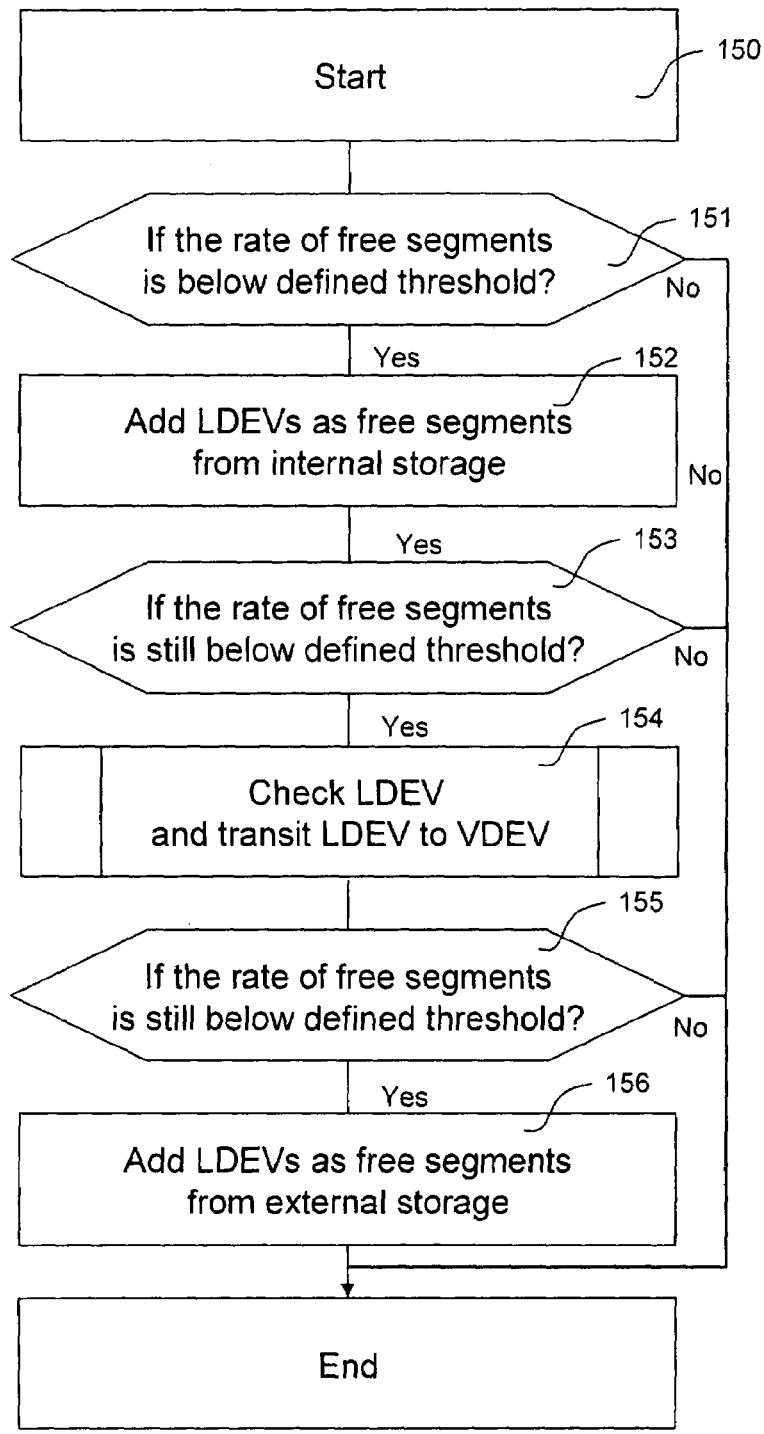
FIG. 14 is a flowchart of a process for managing disk space in a thin-provisioned storage subsystem according to an example embodiment of the present invention.

FIG. 14 shows a flowchart of a process for managing disk space in a thin-provisioned storage subsystem according to an example embodiment of the present invention. If a threshold rate has been set, after the rate has been checked, a segment manager 66 may perform operations based on the checked rate. It is determined if the rate of free segments, compared with a total of segments including used and free segments, is below a defined threshold 151. If not, the process ends, however, if so, then an internal LDEV may be added as free segments to the free segment pool 152. If the administrator indicates that the storage subsystem may select free internal LDEVs from a LU's un-assigned internal LDEVs by themselves, the storage subsystem may insert an un-assigned LDEV to the free segment pool. If the storage subsystem doesn't, the administrator may initiate actions to insert an internal LDEV to the free segment pool on his own via an external console's GUI. As noted previously, an administrator may use the LDEV location information denoting internal or external that may be found in a LDEV configuration mapping 67 as shown in FIG. 5. It is assumed that all unallocated LDEVs which are not mapped to LUs can be used as candidates for a space of free segments in step 152.

In another embodiment of the present invention, one or more LDEV may be automatically assigned to segment pools without the administrator's manual assignment of LDEVs. In this embodiment, assignment occurs when administrator or customer engineer pre-creates a group of auto-assignable LDEVs and assign the created LDEVs to the group. The segment manager may collect a LDEV from LDEVs within the group automatically and assign the LDEV to the segment pool when the segment manager detects that the segment pool is in need. For example, this may occur if it is determined that the number of available segments in the free segment pool is below a certain threshold. If the pre-created group of auto-assignable LDEVs is empty or lacks a sufficient number of LDEVs in the group to meet the current need of the free segment pool, the segment manager may replenish the free segment pool using another method, or may issue a message to the administrator or customer engineer indicating that the group of auto-assignable LDEVs needs to be replenished, or to manually assign LDEVs.

Moreover, it is determined if the rate of free segments is still below the defined threshold 153. If not, the process ends, however, if so, internal LDEVs may be checked to determine if there are candidates for transition from a LDEV to a VDEV, and if so, the transition occurs 154. Details of this process will be discussed later. It is then determined if the rate of free segments is still below the defined threshold 155, and if not the process ends, however, if so, an external LDEV may be added as free segments to the free segment pool 156. If the administrator indicates that the storage subsystem may select a free external LDEV up from a LU's un-assigned external LDEVs, the storage subsystem may insert the un-assigned LDEV to the free segment pool. If the administrator doesn't, the administrator may initiate actions to insert an external LDEV to the free segment pool via an external console's GUI. As noted previously, the LDEV location information denoting internal or external is found in a LDEV configuration mapping 67 as shown in FIG. 5.

Further, in another embodiment, between the processes of determining if the rate of free segments is still below the defined threshold, step 155 and adding an external LDEV as free segments to the free segment pool, step 156, the external storage is checked to determine if there is a candidate for transition from a LDEV to a VDEV in order to create free space, like step 154 and the rate of the free segment pool checked, like step 155. If the storage subsystem detects a lack of free segments in the free segment pool, the storage subsystem may suspends I/O processes for all of the virtual volumes until an administrator adds an internal or external LDEV to be new free segments to the pool, or the storage subsystem may continue I/O until the free segment pool runs out, alerting a user via a GUI, syslog, e-mail, pager, etc during use of external storage, and then may suspend I/O processes until the administrator adds an internal or an external LDEV if the number of segments in the free segment pool 66-1 is zero.

It may be assumed that all unallocated external LDEVs which are not mapped to LUs can be used as candidates for a space of free segments in step 152. In another embodiment of the present invention, one or more LDEV may be automatically assigned to free segment pools without the administrator's manual external LDEVs assignment when administrator or customer engineer pre-creates a group of auto-assignable external LDEVs and assigns their created external LDEVs to the group. The segment manager may collect an external LDEV from external LDEVs within the group. If the group lacks an external LDEV, the storage subsystem may also suspend I/O processes for all of the virtual volumes until an administrator adds an internal or external LDEV to be new free segments to the pool, or adds LDEVs to the group that can be automatically assigned to the free segment pool.

Figure 15:
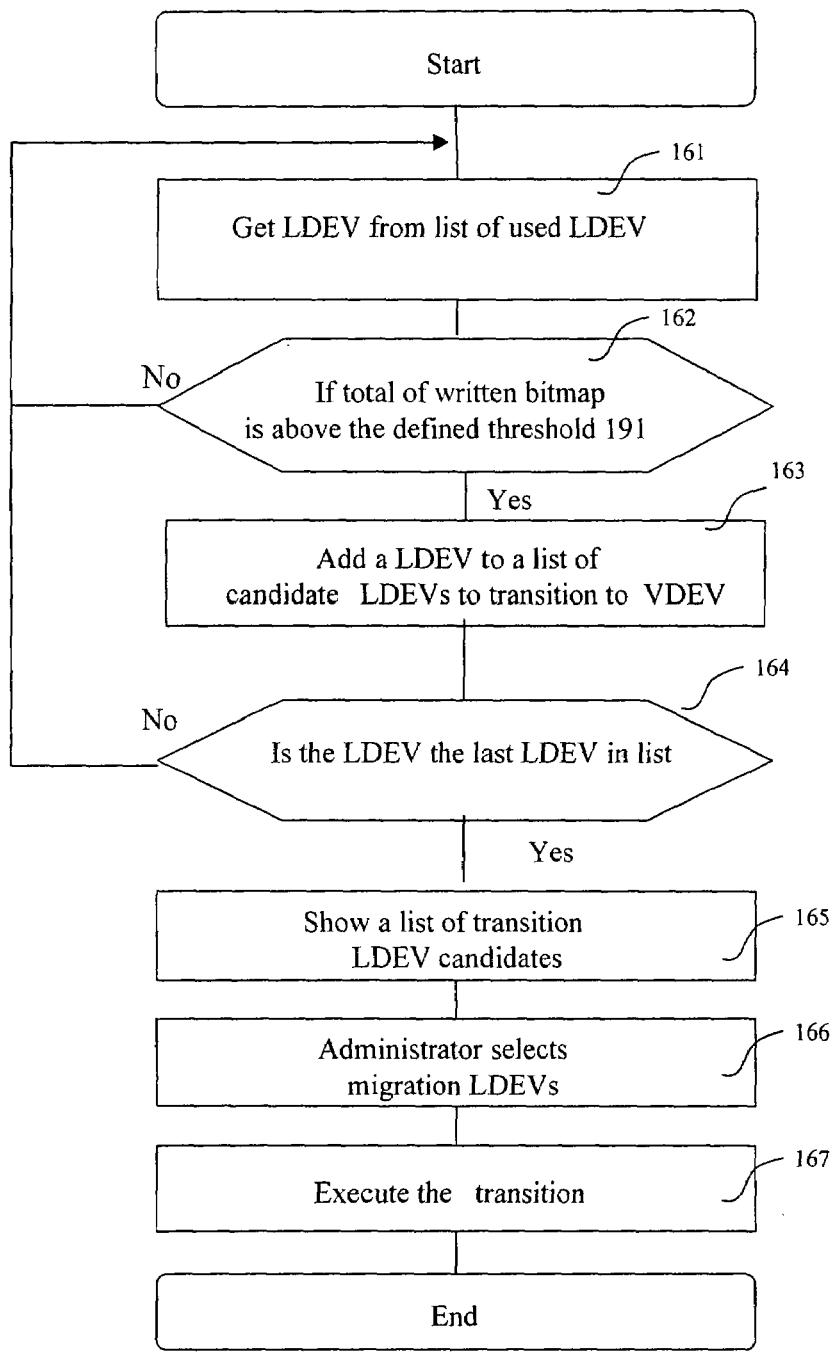
FIG. 15 is a flowchart of a transition process according to an example embodiment of the present invention.

FIG. 15 shows a flowchart of a transition process according to an example embodiment of the present invention. This process occurs during the execution of step 154 discussed in FIG. 14. The storage subsystem may retrieve LDEVs on an internal storage or an external storage. A list of that contains LDEV candidates for transition based on a defined threshold 191 may be obtained, step 161. A LDEV is obtained from a LU-LDEV/VDEV mapping 65. It is determined if a rate of turned on bit map, (e.g., turn on as "1"), in the total bitmap for the LDEV is above a defined threshold, step 162, and if not, the process returns to step 161. If a rate of turn-on-bit map in the total bitmap for the LDEV is above the defined threshold, step 162, a LDEV is added to a list of candidate LDEVs to transit to a VDEV, step 163. It is determined if this is the last LDEV in the list, step 164, and if so the process moves to step 165. However, if this is not the last LDEV, the process returns to step 161. The list may consist of LDEV's numbers. The list of LDEV transition candidates is then shown to an administrator, step 165. The administrator may select LDEVs to transition to a VDEV using a GUI (e.g., FIG. 16, 226), step 166. A transition for the selected LDEVs to a VDEV is executed, step 167.

Figure 16:
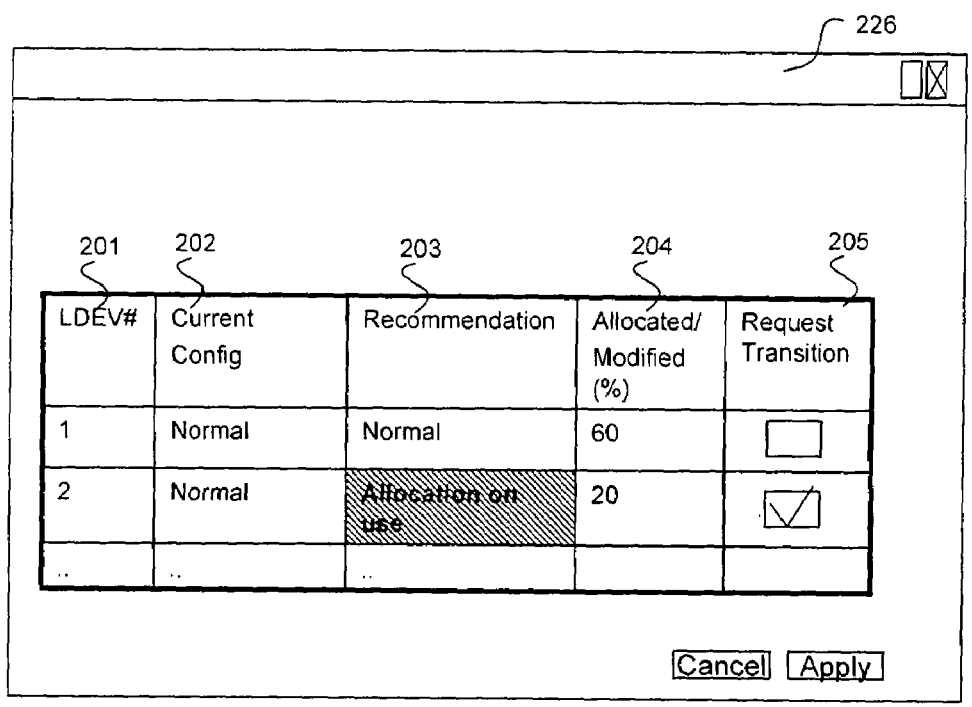
FIG. 16 is a diagram of a GUI for transitioning LDEVs to a VDEV according to an example embodiment of the present invention.

FIG. 16 shows a diagram of a GUI for transitioning LDEVs to a VDEV according to an example embodiment of the present invention. The GUI 226 may consist of a LDEV number 201, a current configuration 202, a recommendation 203 based on a transition candidate list, a rate of written/allocated area on the LDEV, 204, and a selection option 205 to indicate a request for transition from the LDEV to VDEV, as examples. The rate of allocated area 204 may be calculated by using a number of the written bitmap (which is turn on bit map) divided by a total number of bitmap, and converting from a float point to percentage. Specifically:

$$\text{Rate of Allocated Area(LDEV)} = \text{turned on bits/total \# of bits} * 100 \quad \text{(Eq. 1)}$$

Figure 17:
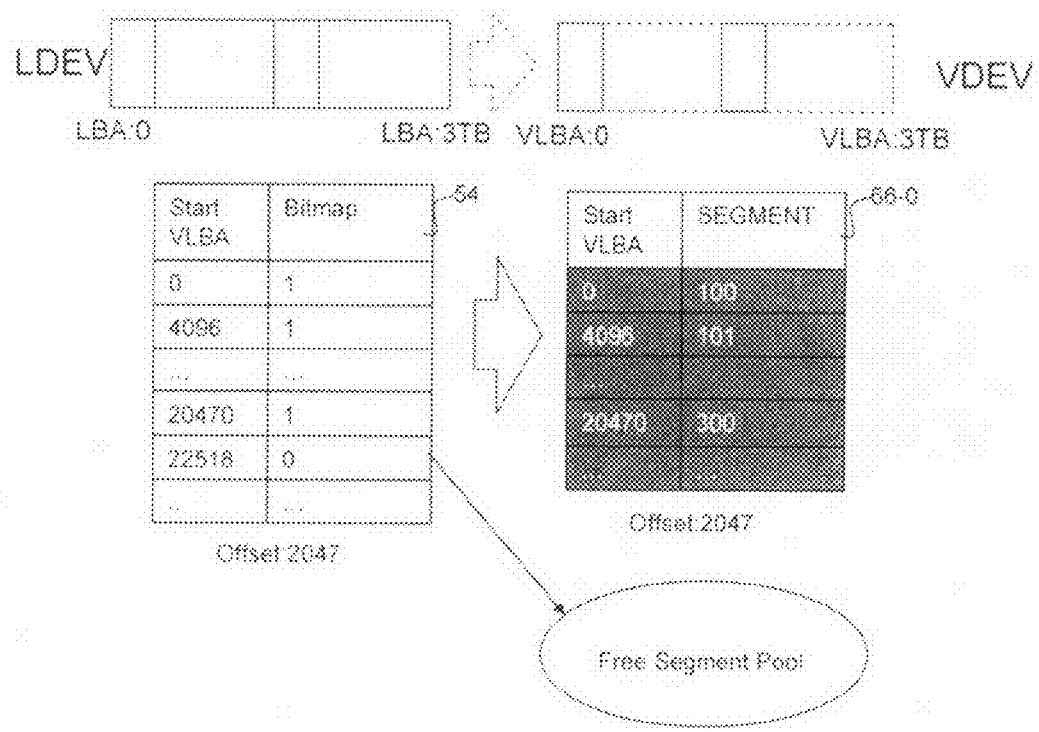
FIG. 17 is a diagram illustrating converting from a type of bitmap to a type of segment during a transition according to an example embodiment of the present invention.

FIG. 17 shows a diagram illustrating converting from a type of bitmap to a type of segment during a transition according to an example embodiment of the present invention. According to embodiments of the present invention, the transition from a LDEV to a VDEV may occur in many ways. For example, one efficient transition method is to convert from a type of bitmap to a type of segment. Initially, a migrater may create a transition task. The migrater selects a VDEV number provided from a VDEV manager (an unused value on table 66-0 in FIG. 8), and reserve the source LDEV in a reserved LDEV, which is puts it in a state to protect the source LDEV from an administrator operation for the source LDEV until the transition of data process has completed. A scheduler may execute the task, and then the migrater may check each bitmap to create each entry in an allocated segment table 66-0. During this time, the location of data for a segment may be the same as a bitmap managed storage segment. After creation of assigned entries for the bitmap, the migrater may purge the other segments as free segments to free segment pool and change the state for the LDEV to "used" LDEV. As a result, there may be no copy between LDEV to VDEV. The transition process may be completed by converting from bitmap 54 to allocated segment table 66-0.

After a customer engineer adds one or more new disks and sets a new parity group on a storage subsystem via a console 401, an administrator may create one or more new LDEVs for use from the parity group and insert the LDEVs via an external console 83. After the creation of a new LDEV, the administrator may assign the new LDEV to a free segment pool as new free segments using a GUI on external console 83.

Figure 18:
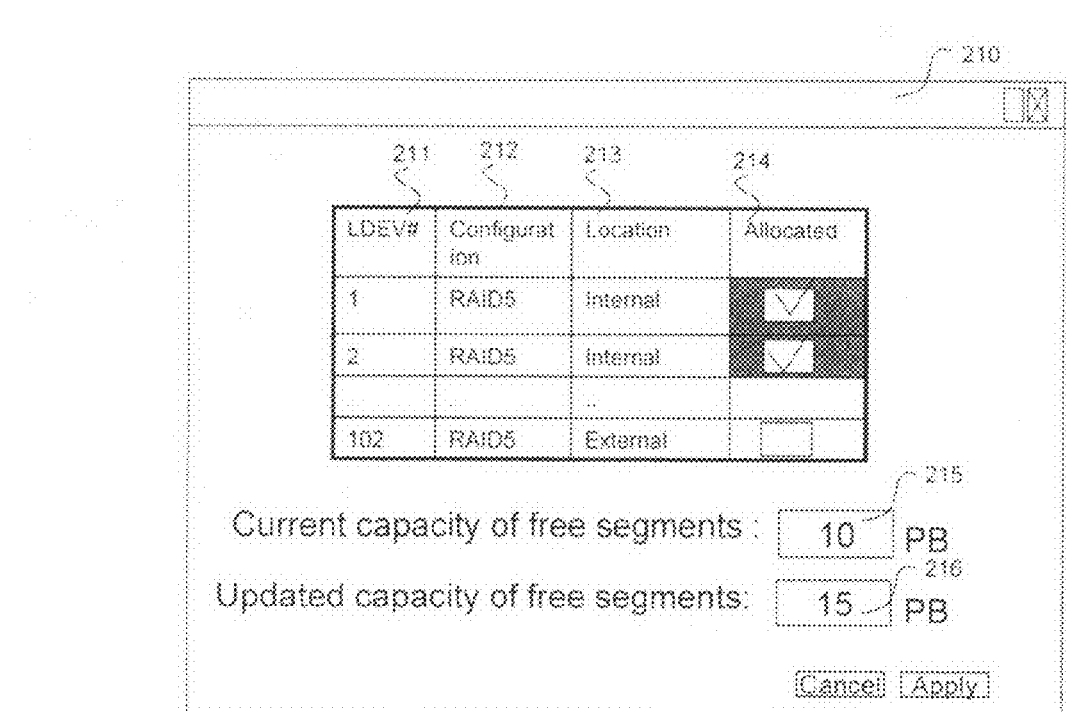
FIG. 18 is a diagram of a GUI for inserting LDEVs into a free segment pool according to an example embodiment of the present invention.

FIG. 18 shows a diagram of a GUI for inserting LDEVs into a free segment pool according to an example embodiment of the present invention. The GUI 210 is used to manage and insert a LDEV 211 into the free segment space by checking a box 214 in the GUI 210 for the LDEV 211. The checking box 214 also shows whether the LDEV is allocated or not. To identify the location of a LDEV in the storage subsystem system, the GUI may also show a storage configuration 212 (see, FIG. 5, 103) and the location of the storage subsystem 213 (see, FIG. 8, 145). The location shows "external" if the parity group consists of only external storage subsystem disks, (ex. Ex1, Ex2 . . . ). Further, if the parity group consists of internal storage subsystem disks and external storage subsystem disks (ex. Ex1, LDEV 300 . . . ), the location may show "mix". Moreover, the location shows "internal" if the parity group consists of only internal disks (ex. LDEV1, LDEV 2 . . . ). Further, the GUI may show a total capacity of remaining free segments 215, to help alert an administrator regarding the remaining free segments in the pool, as well as an updated capacity of remaining free segments 216 after transition.

The total capacity may be calculated to determine a total number of free segments in the free segment pool 66-1, by multiplying the size of a segment, before adding any new LDEVs, and a total capacity of one segment after adding new LDEVs calculated by the capacity 215 plus the new LDEVs' capacity which is calculated by the segment size times a total number of segments with new LDEVs and free LDEVs on the pool.

Figure 19:
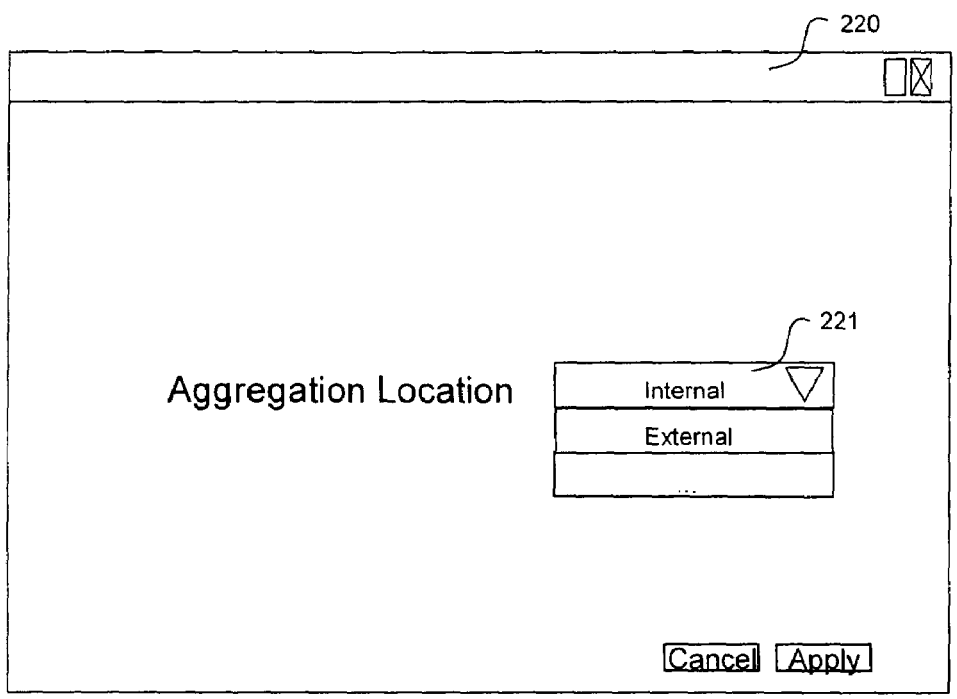
FIG. 19 is a diagram of a portion of a GUI used for an aggregation process according to an example embodiment of the present invention.

FIG. 19 shows a diagram of a portion of a GUI used for an aggregation process according to an example embodiment of the present invention. An administrator uses a GUI 220 to define a location of aggregation like internal, external, etc in a selector option 221. Based on the LDEV additions, an administrator may aggregate or migrate data to a more desired location. For example, an administrator desires to aggregate data on segments from an external storage subsystem to an internal storage subsystem. In another example, an administrator desires to aggregate data on segments from an internal storage subsystem to an external subsystem. All of the data or only part of the data is migrated to the aggregation location depending on the free segments made available due to the LDEV additions. An administrator defines an aggregation location using a GUI 220 in an external console 83. Based on this selection, the storage subsystem mirrors data to the aggregated location after the insertion of the new LDEV to the free segment pool.

Figure 20:
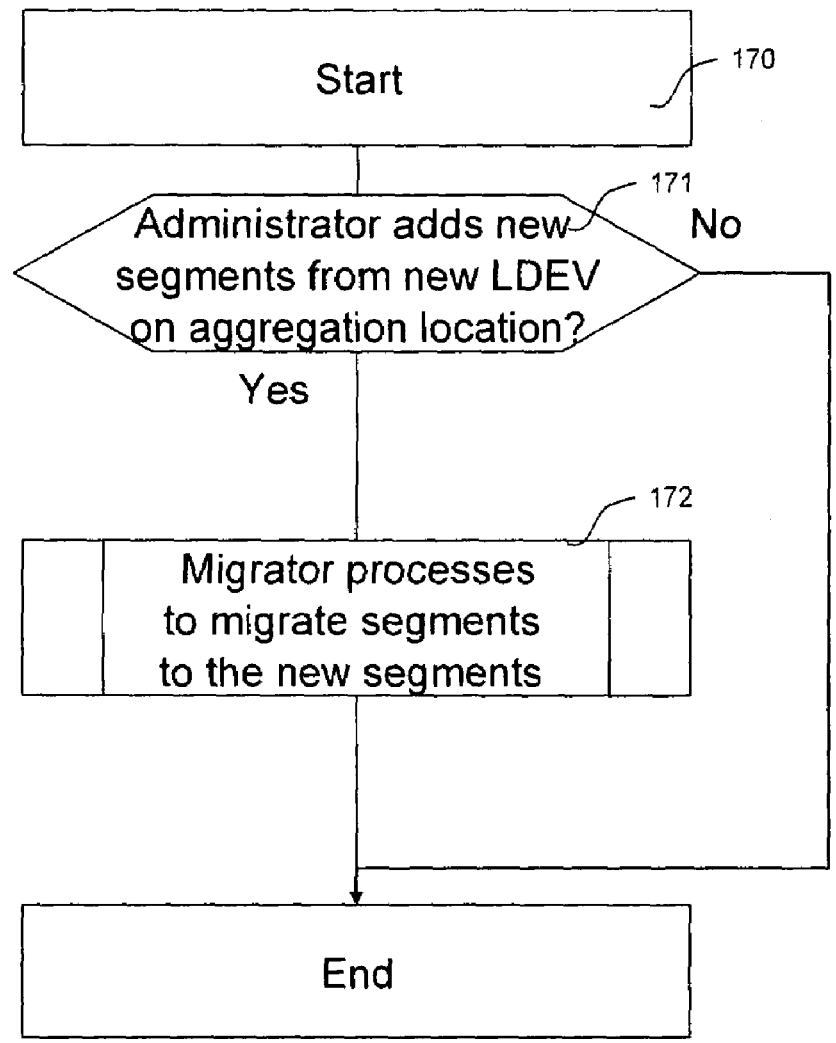
FIG. 20 is a flowchart of a migration process according to an example embodiment of the present invention.

FIG. 20 shows a flowchart of a migration process according to an example embodiment of the present invention. The process starts, step 170, and it is determined if an administrator added a new segments from a new LDEV to an aggregation location, step 171, and if not, the process ends. The administrator inserts a new storage device containing the new segments into the system to make more segments available for a free segment pool. The aggregation location is internal at the storage subsystem or external meaning that the newly added storage device resides at an external or remote storage subsystem. If an administrator added a new LDEV as new segments, step 171, a migrater initiates operations or processes to migrate data from VDEV segments to the new segments at the aggregation location, step 172, and assigns the new segments to the VDEV. The migration migrates only part of the data depending on the available new segments added to the free segment pool.

In another embodiment of the present invention, step 171 may be implemented differently. The storage subsystem may process an administrator defined policy after administrator's insertion of storage device. The policy processes the creation of parity group, creation of LDEVs, and insertion of LDEVs into segment pool. For an example to insert directly segments after disk insertion, an administrator may pre-configure a policy which is to create 4D+1P by RAID5 when 5 disks are inserted on the storage subsystem, to create 2TB LDEVs from the created parity group, to insert the LDEV into the segment pool. The segment manager automatically creates segments for the segment pool after disk insertion based on the policy. In another example to insert LDEVs in the defined LDEV group, an administrator pre-configures a policy which is to create 4D+1P by RAID5 when 5 disks are inserted on the storage subsystem, to create 2TB LDEVs from the created parity group, to insert the LDEV into each internal or external LDEV group. The segment manager is notified of the insertion of LDEVs and creates segments for the segment pool.

Figure 21:
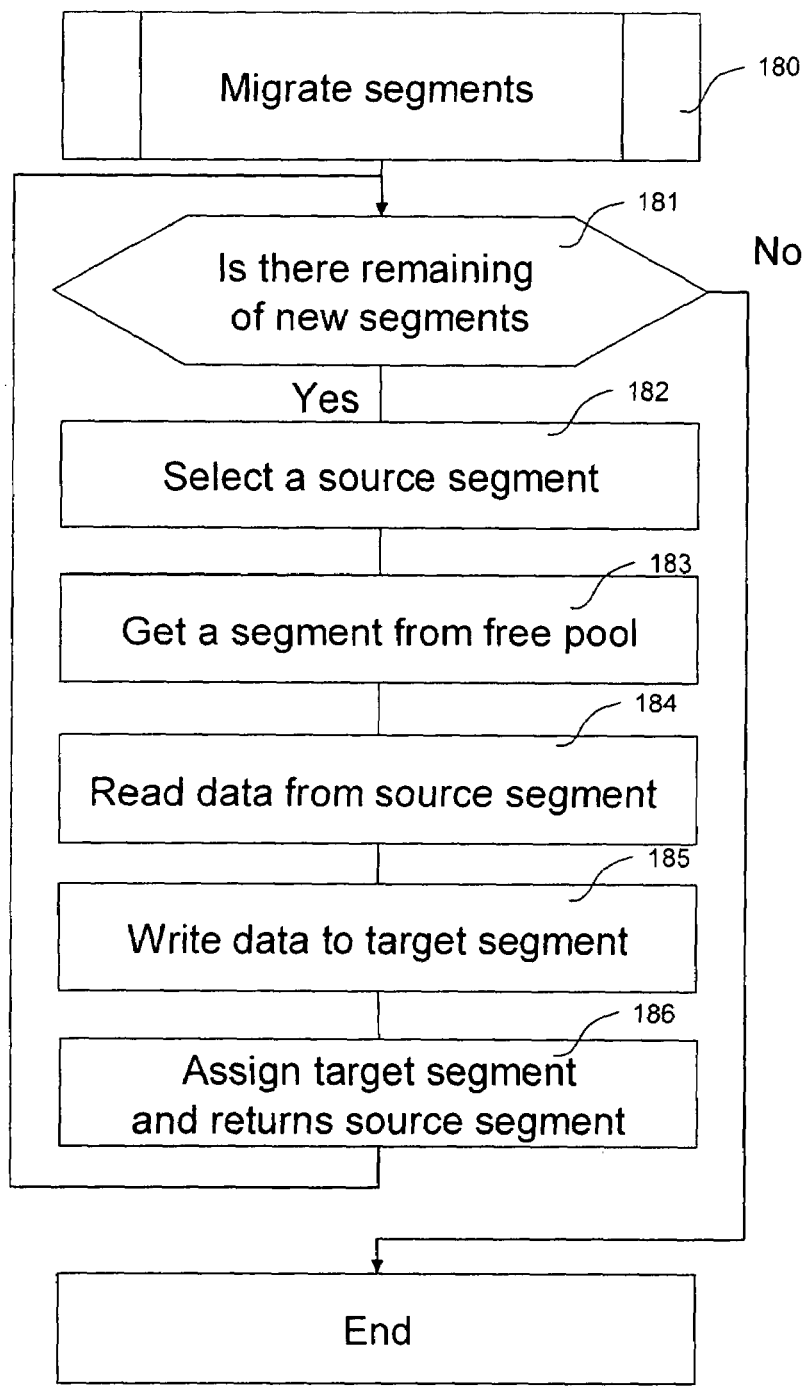
FIG. 21 is a flowchart of a segment migration process according to an example embodiment of the present invention.

FIG. 21 shows a flowchart of a segment migration process according to an example embodiment of the present invention. The migration process begins, step 180, and a migrater confirms if there are any remaining free segments to be migrated and inserted to the new LDEVs, step 181. If there is no segment for the new LDEVs, the process ends. If there are still segments remaining for the new LDEVs, the migrater selects a source segment for the aggregated location using location in an allocation table (FIG. 8, 145), step 182. The migrater obtains a segment on the new LDEVs from the free segment pool, step 183. The migrater reads data from the selected source segment, step 184. During migration, an I/O operation for the segment is performed on the memory accessing a relative LBA. The relative LBA may be odd divided an I/O requested LBA by the segment size. The data read from the source segment is written in the target segment on the memory, step 185.

During the write, a read I/O operation for the source segment from a host is continued using the data which is written on memory and a write I/O operation for it is stacked on the I/O buffer in controller 41 until the end of copy operation which is data read for the source segment and the write for the target segment. The duration of the write operation is short if the segment is equal to the parity's stripping size. The written segment is assigned in an allocation table, (FIG. 8) and the source segment is returned to the free segment pool (FIG. 7), step 186. According to embodiments of the present invention, a host can write data even during the migration of a segment.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein; rather, the present invention extends to all functionally equivalent structures, methods and uses, such as are within the scope of the appended claims.

What is claimed is:

1. A method for managing disk space in a first storage system, said first storage system being couple with a second storage system, the second storage system presenting at least one second storage volume configured with a plurality of physical storages in the second storage system as a storage resource to the first storage system, the first storage system presenting at least one virtual volume as a storage resource to a host device, the method for managing disk space in the first storage system comprising:

managing a plurality of segments, including a first segment from at least one first storage volume configured with a plurality of physical storages in the first storage system and a second segment from the at least one second storage volume configured with a plurality of physical storages in the second storage system as free segments in a free segment pool;

mapping the first and second segments from the free segment pool to the at least one virtual volume so as to present the first and second segments via the virtual volume to the host device;

determining whether a number of the free segments in the free segment pool is below a predetermined threshold; and adding another segment from one of the at least one first storage volume of the first storage system or the at least one second storage volume of the second storage system to the free segment pool when the number of the free segments in the free segment pool is below the predetermined threshold.

2. The method according to claim 1,
wherein adding another segment from one of the at least one first storage volume of the first storage system or the at least one second storage volume of the second storage system is performed by an administrator using one or more graphical user interfaces at a maintenance console.

3. The method according to claim 1,
wherein adding another segment from one of the at least one first storage volume of the first storage system or the at least one second storage volume of the second storage system occurs automatically when the number of free segments falls bellow the predetermined threshold.

4. The method according to claim 1, further including steps of receiving a write command at the first storage system from the host device directed to the at least one virtual volume assigning a segment from the free segment pool to the at least one virtual volume when a determination is made that a segment has not been assigned for a logical block address targeted by the write command; and carrying out said step of determining whether the number of the free segments in the free segment pool is below the predetermined threshold.

5. A first storage system coupled with a second storage system, the second storage system presenting a second storage volume as a storage resource to the first storage system, the first storage system presenting a virtual volume as a storage resource to a host computer, the first storage system comprising:

a first interface to be coupled with the host computer for receiving an I/O request;

a second interface to be coupled with the second storage system to enable storing data;

a processor configured to manage at least one first storage volume configured with one or more storage devices in the first storage system and to manage the second storage volume, said second storage volume being configured with at least one storage device in the second storage system, wherein said processor manages a plurality of segments as free segments in a free segment pool, including a first segment from at least one first storage volume configured with a plurality of physical storages in the first storage system and a second segment from the at least one second storage volume configured with a plurality of physical storages in the second storage system, wherein said processor maps the first and second segments from the free segment pool to the at least one virtual volume so as to present the first and second segments via the virtual volume to the host computer, wherein said processor adds another segment from one of the at least one first storage volume of the first storage system or the at least one second storage volume of the second storage system to the free segment pool when the number of the free segments in the free segment pool is below a predetermined threshold.

6. The system according to claim 5, further including
a maintenance console in communication with said first storage system, said maintenance console including a graphical user interface to enable an administrator to add another segment from the first storage system and/or add at least one segment from the second storage system.

7. The system according to claim 5,
wherein the processor is configured to automatically add another segment from the first storage system and/or add at least one segment from the second storage system when the number of free segments falls bellow the predetermined threshold.

8. The system according to claim 5,
wherein said storage system is configured to allocate storage capacity to said virtual volume on an as-needed basis, and wherein when said first storage system receives a write command from the computer directed to the virtual volume, said processor is configured to assign a segment to the virtual volume from the free segment pool when a determination is made that a segment has not been assigned for a logical block address targeted by the write command, and then determine whether the number of the free segments in the free segment pool is below the predetermined threshold.

* * * * *